United States Patent
Gretz

(10) Patent No.: US 8,772,649 B1
(45) Date of Patent: Jul. 8, 2014

(54) ELECTRICAL BOX AND FRAME ASSEMBLY FOR SHALLOW WALL CAVITIES FORMED BY FURRING STRIPS

(71) Applicant: Arlington Industries, Inc., Scranton, PA (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 165 days.

(21) Appl. No.: 13/647,794

(22) Filed: Oct. 9, 2012

Related U.S. Application Data

(63) Continuation-in-part of application No. 13/605,379, filed on Sep. 6, 2012, now Pat. No. 8,664,542.

(51) Int. Cl.
*H05K 7/14* (2006.01)

(52) U.S. Cl.
USPC .............. 174/480; 174/53; 248/906; 439/535

(58) Field of Classification Search
USPC ...................... 174/53, 480, 535, 50; 248/906; 220/4.02; 439/535
See application file for complete search history.

(56) References Cited

U.S. PATENT DOCUMENTS

| | | | | |
|---|---|---|---|---|
| 4,613,728 A | * | 9/1986 | Lathrop | 174/53 |
| 4,758,687 A | * | 7/1988 | Lathrop | 174/53 |
| 5,486,650 A | * | 1/1996 | Yetter | 174/53 |
| 5,965,844 A | | 10/1999 | Lippa | |
| 6,147,304 A | | 11/2000 | Doherty | |
| 7,038,132 B1 | | 5/2006 | Lowe et al. | |
| 7,141,736 B2 | * | 11/2006 | Plankell | 174/50 |
| 7,557,308 B2 | | 7/2009 | Dinh | |
| 7,595,446 B2 | * | 9/2009 | Turcovsky et al. | 174/50 |
| 7,618,284 B2 | * | 11/2009 | Lamoureux et al. | 439/535 |
| 7,841,878 B2 | | 11/2010 | Johnson et al. | |

* cited by examiner

*Primary Examiner* — Dhirubhai R Patel

(57) ABSTRACT

An electrical box and frame assembly for mounting an electrical component such as a duplex receptacle in a shallow wall cavity. The electrical box assembly includes a box member, a receptacle frame adapted to receive an electrical component, and a trim plate. Rotatable flags on the box member provide ease of installation to a wall in old or new work situations. The box member includes sidewalls of a narrow depth to enable mounting within a shallow wall cavity. The receptacle frame nests substantially within the cavity of the box member and the trim plate secures over the receptacle frame and is mounted to the box member. An outer sidewall on the receptacle frame includes bosses thereon for securing a duplex receptacle in a sideways orientation with respect to the box member and wall cavity thereby enabling the electrical box and frame assembly to be mounted in a shallow wall cavity.

19 Claims, 17 Drawing Sheets

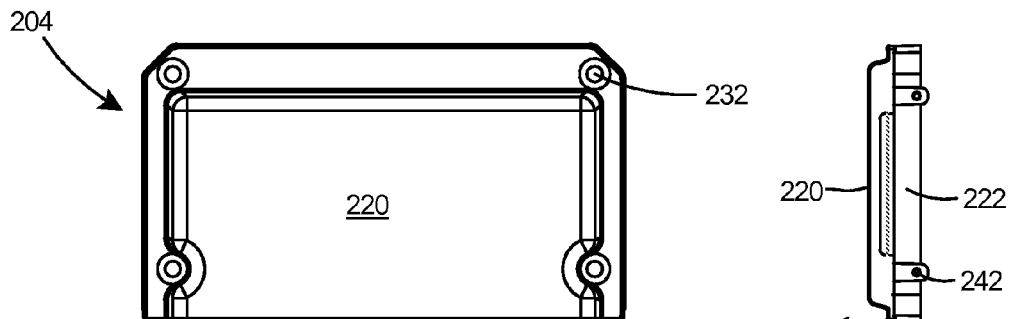
Fig. 18
Fig. 19
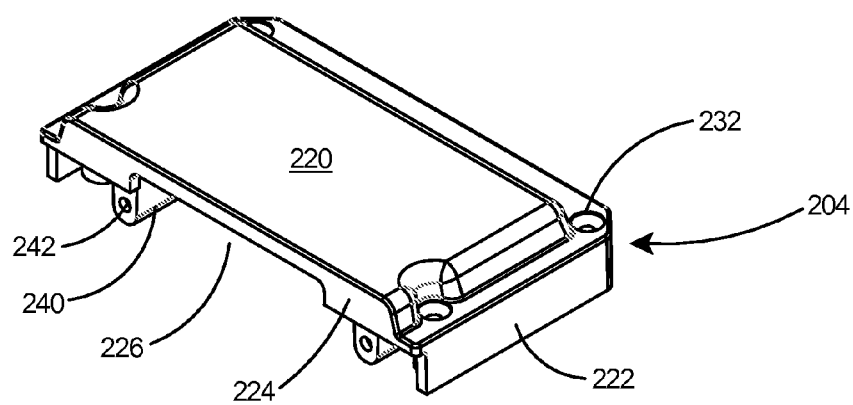
Fig. 20
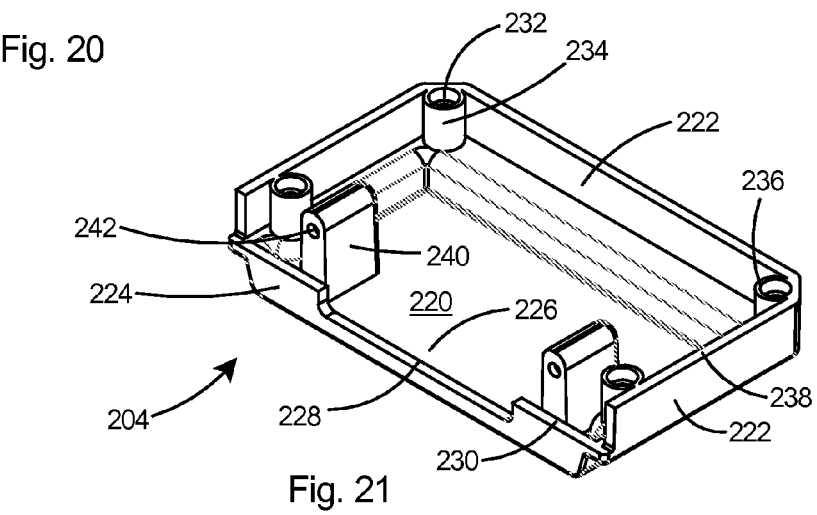
Fig. 21

ELECTRICAL BOX AND FRAME ASSEMBLY FOR SHALLOW WALL CAVITIES FORMED BY FURRING STRIPS

This application is a Continuation-In-Part of U.S. patent application Ser. No. 13/605,379, filed on Sep. 6, 2012 entitled "Electrical Box and Frame Assembly for Shallow Wall Cavities formed by Furring Strips", of which the entire contents of said application is incorporated herein in its entirety by reference thereto.

FIELD OF THE INVENTION

This invention relates to the installation of electrical components and specifically to an electrical box and frame assembly for mounting electrical components in shallow wall cavities formed by furring strips.

BACKGROUND OF THE INVENTION

In home construction it is often desirable to maximize floor space and minimize the area taken up by walls. This is especially true in the construction of mobile homes and pre-manufactured homes. In these applications furring strips are often used to form walls the walls. As furring strips are only ¾ inch wide and the covering drywall is typically ½ to ⅝ inch thick, the resulting wall cavities are as narrow as 1.25 inches. In such a wall formed by furring strips, conventional electrical boxes are unusable as their depth far exceeds the depth of the shallow wall cavities. Thus it is difficult for a homeowner to mount an electrical device such as a wall-mountable flat panel television. Mounting such an electrical device in a wall formed by furring strips is possible but very undesirable as the electrical box will typically extend outward of the finished wall.

Commonly owned U.S. patent application Ser. No. 13/605,379, disclosed an electrical box and frame assembly for use on walls having shallow wall cavities, such as those walls formed by furring strips. The electrical box and frame assembly included a box member, a receptacle frame, and a trim plate for mounting an electrical component to a wall having a shallow wall cavity. The current invention improves upon the electrical box and frame assembly of the parent invention by improving the ease of mounting an electrical device to the box and frame assembly. The instant invention splits the receptacle frame opening between the main bracket and the cover that forms the outside of the electrical box. The receptacle or other device is mounted to the bosses on the inside of the cover after being wired, then that assembly is mounted to the large main bracket with screws. The electrical box and frame assembly of the current invention eliminates the need to use nuts to mount the electrical device to the assembly.

SUMMARY OF THE INVENTION

The invention is an electrical box and frame assembly for mounting an electrical component such as a duplex receptacle in a shallow wall cavity. The electrical box assembly includes a box member, a receptacle frame, and a trim plate. The receptacle frame is adapted to accept a duplex receptacle or similar electrical component. The box member includes rotatable flags to enable a simple wall installation in old work situations. The box member includes sidewalls and a back wall that form a mounting cavity. The sidewalls of the box member include a narrow depth to fit within a shallow wall cavity. The receptacle frame nests substantially within the cavity of the box member and the trim plate secures over the receptacle frame and is mounted to the box member. The receptacle frame secures the duplex receptacle sideways with respect to the box member and wall cavity thereby enabling the electrical box and frame assembly to be mounted in shallow wall cavity. The electrical box and frame assembly can be used with a second electrical box and frame assembly to provide a bridge for providing an electrical outlet on a portion of a wall that is remote from an existing outlet. The second electrical box and frame assembly would include a cord grip for securing a flexible cord to the receptacle frame. The plug end of the flexible cord is plugged into a nearby existing electrical outlet after which line voltage is fed from the flexible cord through the second box and frame assembly to the first box and frame assembly to power the duplex receptacle mounted in the first box and frame assembly.

OBJECTS AND ADVANTAGES

Several advantages are achieved with the electrical box and frame assembly of the present invention, including:

(1) The electrical box and frame assembly enables the mounting of an electrical component in a shallow wall cavity.
(2) The electrical box and frame assembly enables the mounting of an electrical component in a wall cavity of at least 1.25 inches.
(3) The electrical box and frame assembly enables the mounting of an electrical component in a wall cavity formed by furring strips.
(4) The electrical box and frame assembly includes rotatable flags to enable rapid connection to a wall.
(5) The electrical box and frame assembly is adapted for use in old work and new work situations.
(6) The electrical box and frame assembly can be used with a second electrical box and frame assembly to provide a means of powering a TV or similar electronic device with minimal disruption to surrounding wall surfaces and eliminating the need to pull electrical cables through adjacent furring strips or studs in the wall.
(7) The electrical box and frame assembly facilitates placement of furniture against the wall as electrical components mounted therein are substantially recessed within the wall.

These and other objects and advantages of the present invention will be better understood by reading the following description along with reference to the drawings.

DESCRIPTION OF THE DRAWINGS

FIG. 18 is a front view of the receptacle frame portion of the electrical box and frame assembly of FIG. 17.

FIG. 19 is a side view of the receptacle frame of FIG. 18.

FIG. 20 is a perspective view of the receptacle frame of FIG. 18.

FIG. 21 is a perspective view of the opposing side of the receptacle frame of FIG. 20.

DETAILED DESCRIPTION OF THE INVENTION

Figure 1:
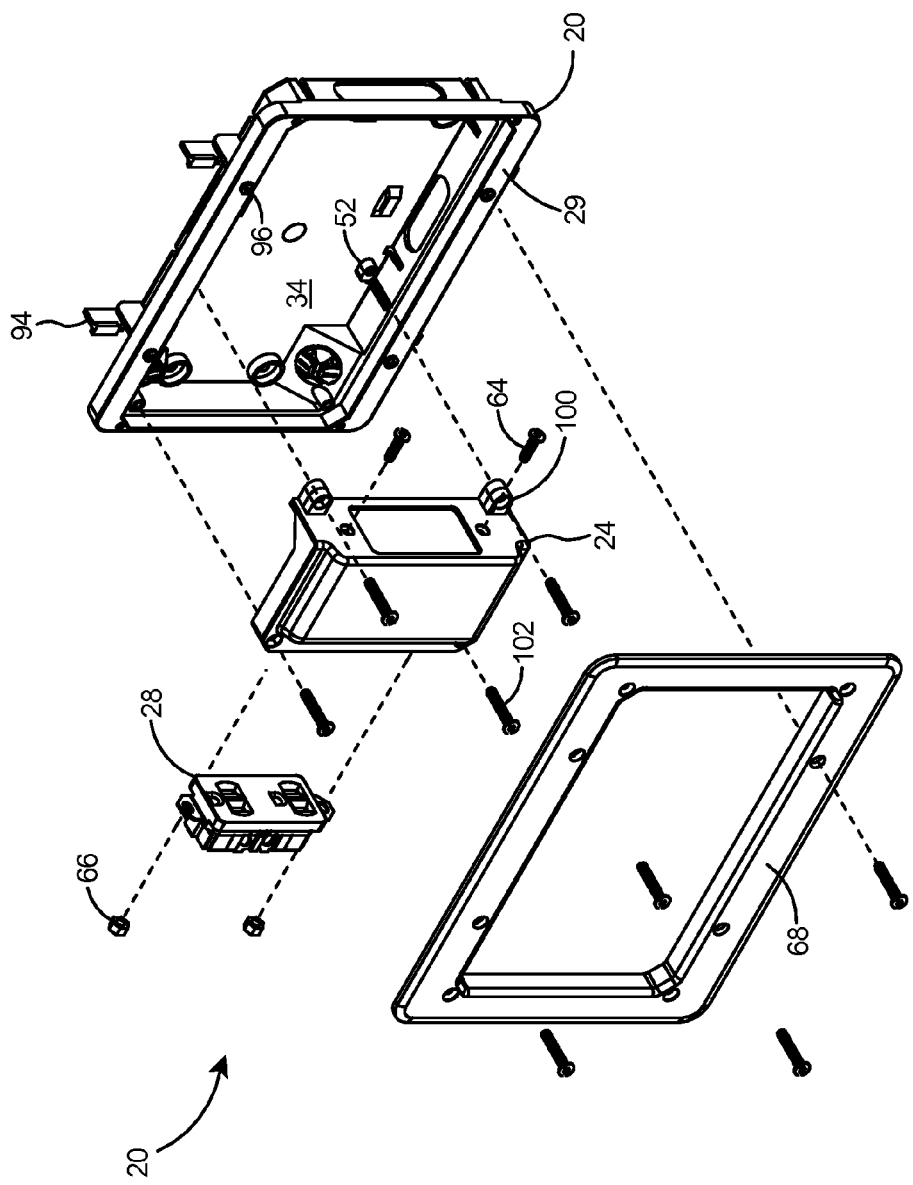
FIG. 1 is an exploded perspective view of a first embodiment of the electrical box and frame assembly of the present invention.

Referring to FIG. 1 there is shown a first embodiment of an electrical box and frame assembly 20 according to the present invention. The electrical box and frame assembly 20 includes a box member or box 22, a receptacle frame 24, and a trim plate 26 that work in conjunction to mount an electrical component such as the duplex receptacle 28 shown in the figure.

Figure 2:
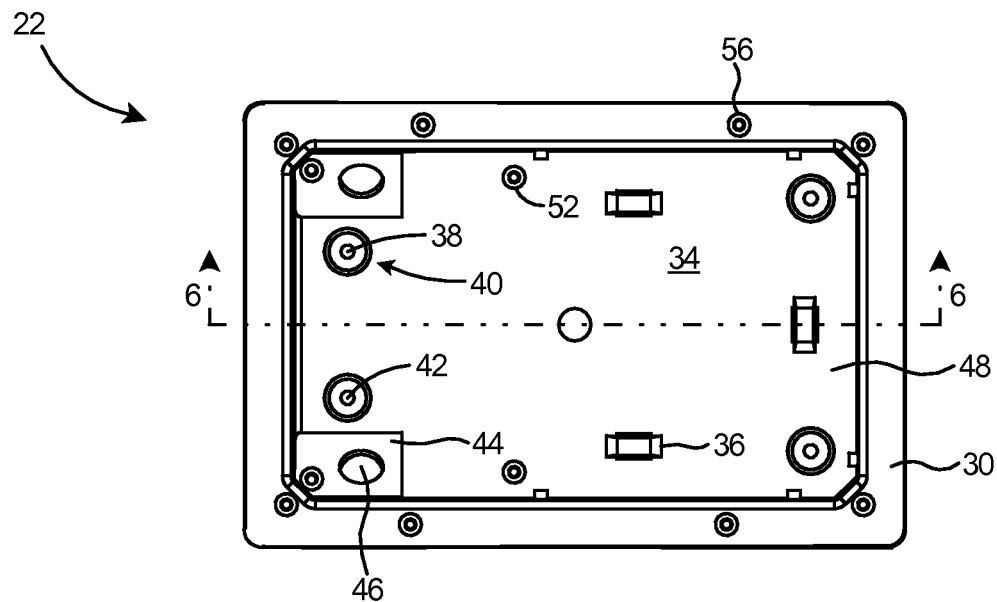
FIG. 2 is a front view of the box member portion of the electrical box and frame assembly of FIG. 1.
Figure 3:
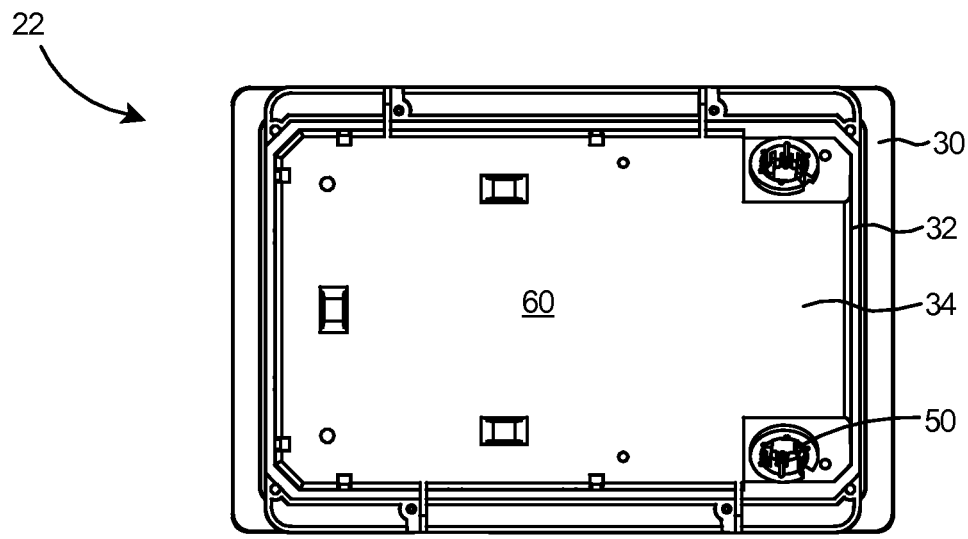
FIG. 3 is a rear view of the box member.

With reference to FIGS. 2 and 3, the box member 22 includes a front edge 29, a peripheral flange 30, sidewalls 32 integral with the peripheral flange, and a back wall 34. One or more tie-off clips 36 extend from the back wall 34 of the box member and function as tie-offs for tying off cables (not shown) which roughing in the box member during installation on a wall. A plurality of apertures 38 are provided in the back wall 34 of the box member and provide a fastening arrangement 40 for securing the box member when it is used with new construction, such as prior to framing the walls. The apertures 38 provide a location for fastening screws (not shown) there through for securing the box member 22 to the substrate. Collars 42 are provided around each aperture 38 to prevent abrasion of wires (not shown) by screw heads. A slanted mounting surface 44 including knockouts 46 therein are provided in the inner cavity 48 of the box member 22 and provide locations for insertion of cable connectors 50, such as the non-metallic NM-94 cable connector shown in FIG. 3 and available from Arlington Industries, Inc. of Scranton, Pa. Bosses 52 provided on the back wall 34 and on the slanted mounting surface 44 function to accept fasteners 54 for securing the receptacle frame 24 (see FIG. 1) to the box member. Bosses 56 are provided in peripheral flange 30 to accept fasteners 58 for securing the trim plate 26 (see FIG. 1) to the box member 22. The back wall 34 has a rear surface 60 as shown in FIG. 3.

Figure 4:
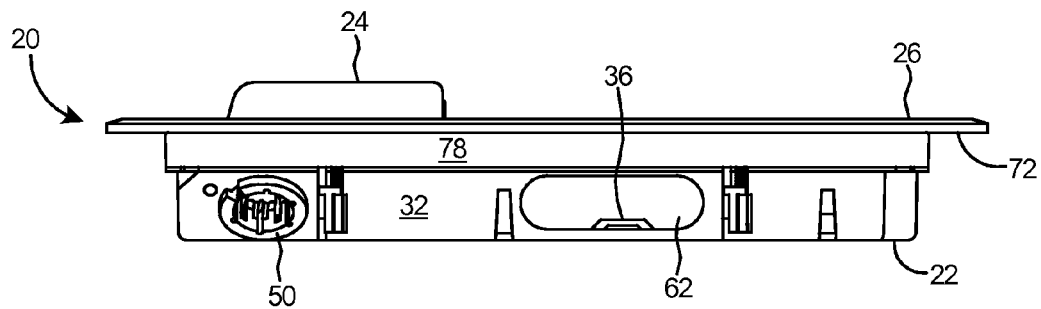
FIG. 4 is a side view of the electrical box and frame assembly.
Figure 5:
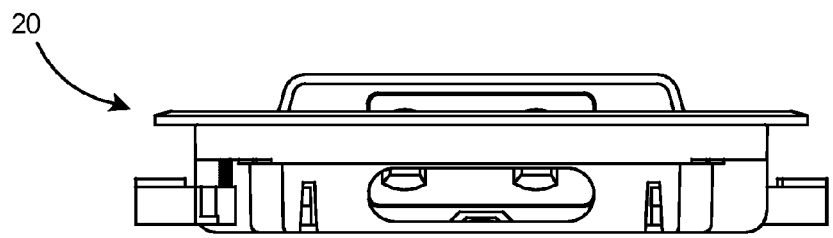
FIG. 5 is an end view of the electrical box and frame assembly.
Figure 6:
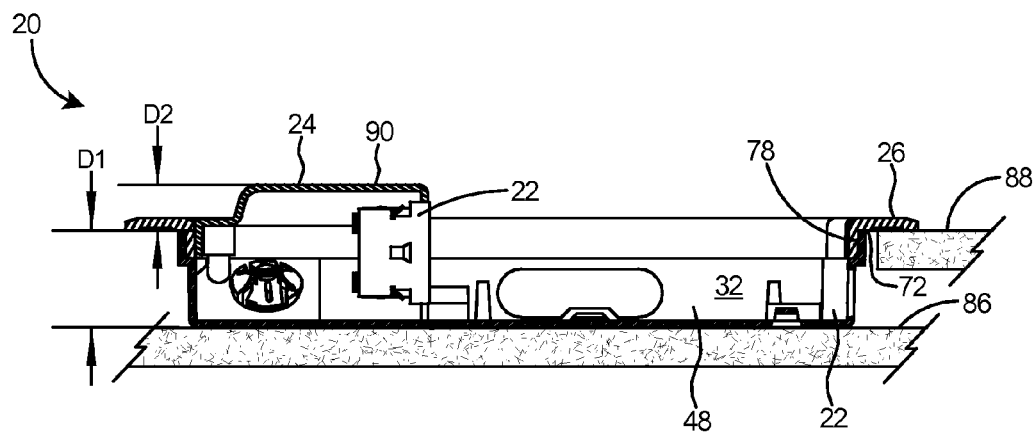
FIG. 6 is a sectional view of the electrical box and frame assembly secured to a wall.

Referring to FIGS. 4-6, box member 22 includes one or more cable openings 62 to provide a passageway for feeding low voltage cables (not shown) into the box cavity 48. Cable tie-off clips 36 are conveniently in axial alignment with the cable opening 62 to provide tie-off locations as low voltage cables (not shown) are fed into the box cavity 48. FIG. 6 depicts the box member 22 with the receptacle frame 24 secured therein and with a duplex receptacle 28 secured to the receptacle frame 24. As shown in FIG. 1, the duplex receptacle 28 is secured to the receptacle frame 24 by screws 64 and wire nuts 66.

Figure 12:
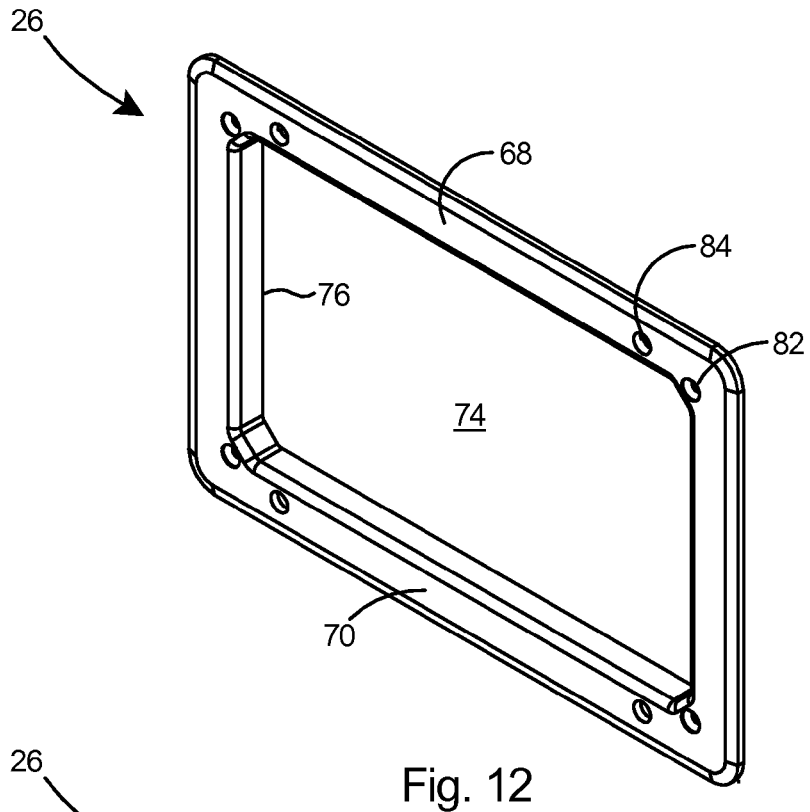
FIG. 12 is a front perspective view of the trim plate that forms a portion of the electrical device mounting assembly of FIG. 1.
Figure 13:
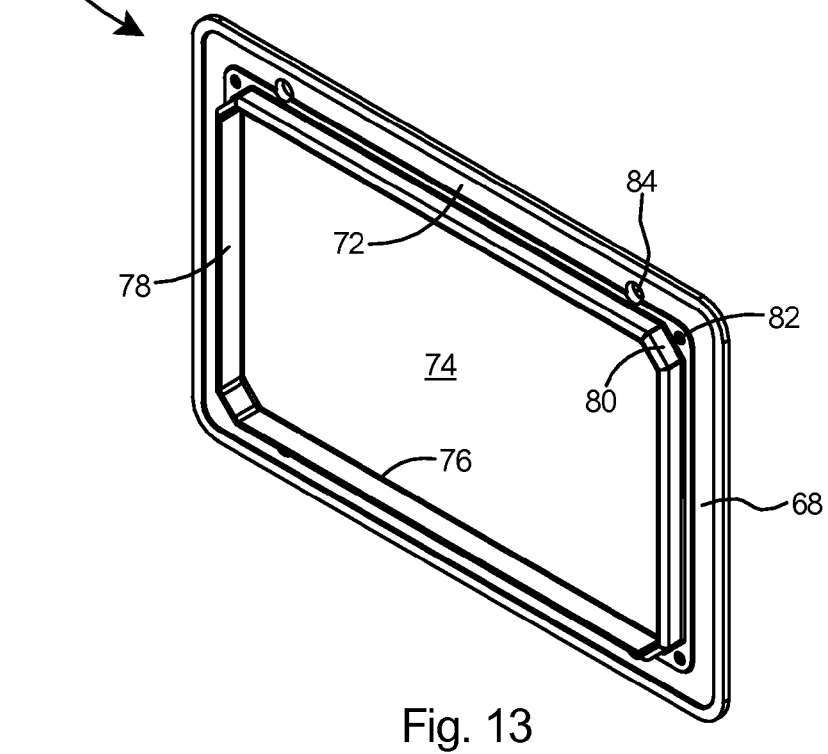
FIG. 13 is a rear perspective view of the trim plate.

With reference to FIGS. 12 and 13, the trim plate 26 includes a flange 68 having a front side 70 and a rear side 72 with an opening 74 defined by an inner periphery 76. A peripheral wall 78 extends from the rear side 72 of the flange 68 around the inner periphery 76. The peripheral wall 78 includes truncated corners 80. The flange 68 portion of the trim plate 26 includes inner apertures 82 and outer apertures 84. Peripheral wall 78 of trim plate 26 is sized such that the peripheral wall will nest within the sidewalls 32 of the box member 22 when the two are secured together (see FIG. 1).

Referring the FIG. 6, the peripheral wall 78 of the trim plate 26 is slightly smaller than the sidewalls 32 of the box member 22 and thus will nest within the sidewalls 32 of the box member 22. The significant advantage of the electrical box and frame assembly 20 of the present invention is that the entirety of the box member 22 will fit within the shallow wall cavity 86 of a wall 88 formed with furring strips (not shown). Typically the shallow wall cavity 86 has a depth, equal to dimension D1 on FIG. 6, of 1.25 inches. When electrical box and frame assembly 20 are fully installed, the rear side 72 of trim plate 26 is flush against the wall 88 and, with ½-inch thick wallboard, the outer wall 90 of the receptacle frame 24 extends outward of the wall surface only a slight distance of 0.585-inch, denoted by dimension D2 in FIG. 6, from the outer surface of the wall 88.

Figure 7:
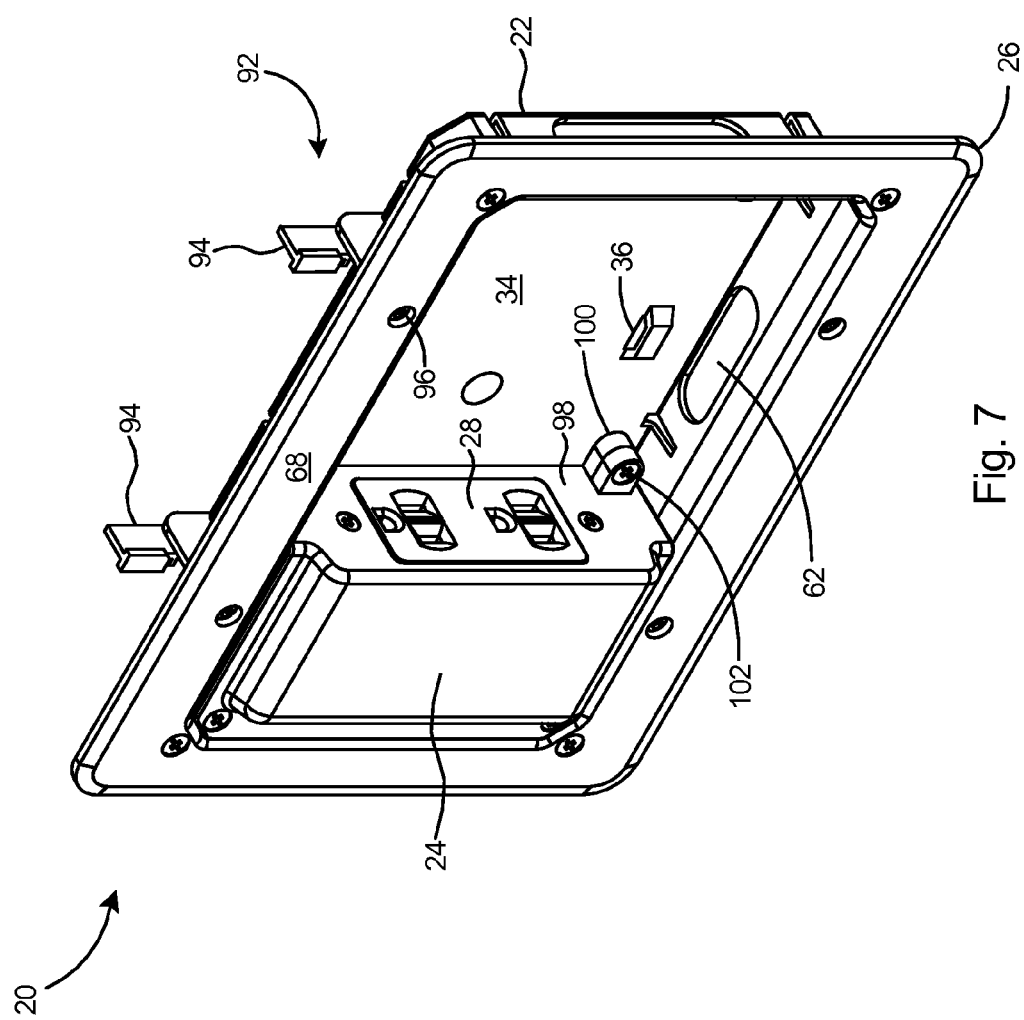
FIG. 7 is a perspective view of a fully assembled electrical box and frame assembly according to the present invention.

Referring to FIG. 7 there is shown a fully assembled electrical box and frame assembly 20 according to the present invention. The electrical box and frame assembly 20 includes a mounting arrangement 92 for securing the assembly to a wall (not shown). The mounting arrangement 92 includes rotatable flags 94 that are attached to the distal ends of the mounting fasteners 96 that are rotated clockwise to draw rotatable flags toward the trim plate 26 to thereby secure the electrical box and frame assembly 20 to the wall. Receptacle frame 24 includes a short sidewall 98 and lugs 100 extending outward from the short sidewall 98. The receptacle frame 24 is secured to the back wall 34 of the box member 22 by fasteners 102 driven through lugs 100.

Figure 14:
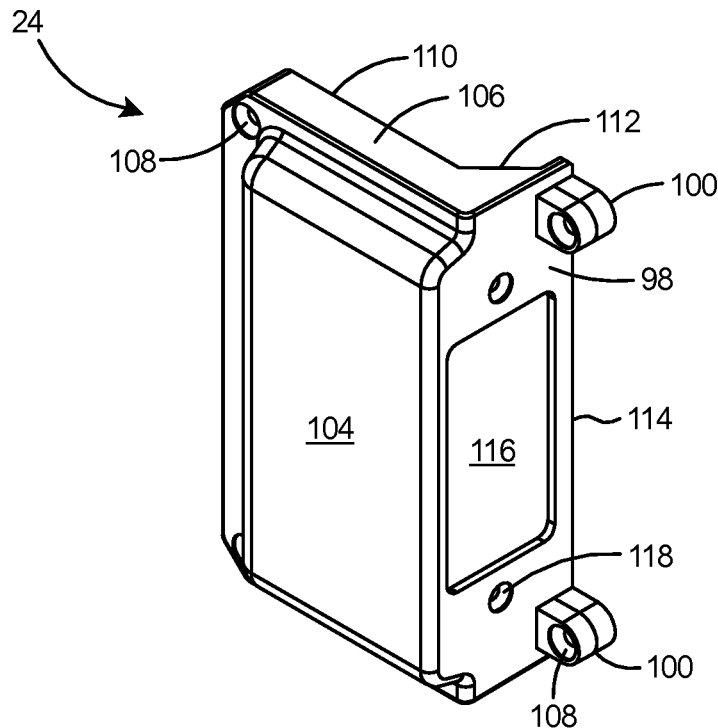
FIG. 14 is a perspective view of a receptacle frame that forms a portion of the electrical device mounting assembly of FIG. 1.
Figure 15:
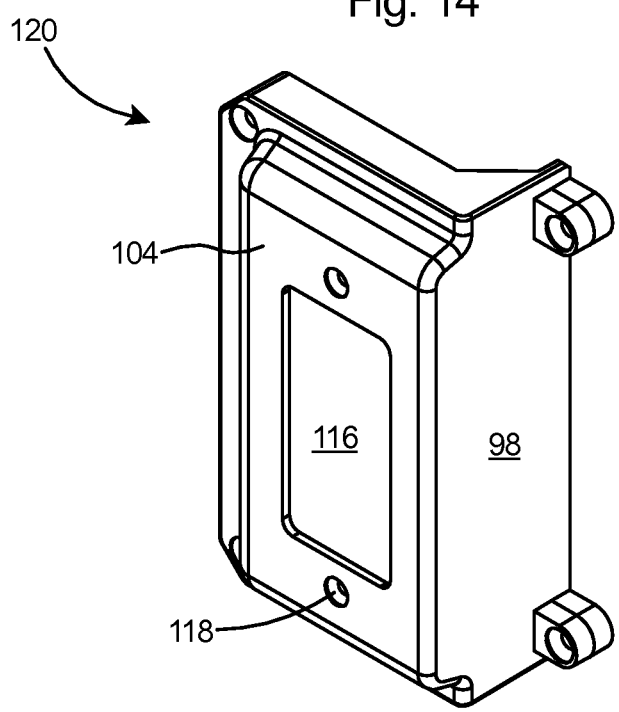
FIG. 15 is a perspective view of a second embodiment of the receptacle frame.

With reference to FIG. 14, in addition to outer wall 90 the receptacle frame 24 further includes end walls 106 and bores 108 there through a portion of the outer wall 90 and through the lugs 100. End walls 106 include edges 110 and 112 and short sidewall 98 includes edge 114. The receptacle frame 24 will form an electrical box after it is secured to the box member 22 (see FIG. 1) as edges 110, 112, and 114 are secured against the back wall 34 of the box member 22. Receptacle frame 24 includes an opening 116 and apertures 118 in the short sidewall 98 to enable connection of a duplex receptacle 28 as shown in FIG. 1. As shown in FIG. 15, a second embodiment of the receptacle frame 120 includes the opening 116 and apertures 118 in the outer wall 90 rather than in the short sidewall as for the first embodiment of the receptacle frame 24.

Figure 8:
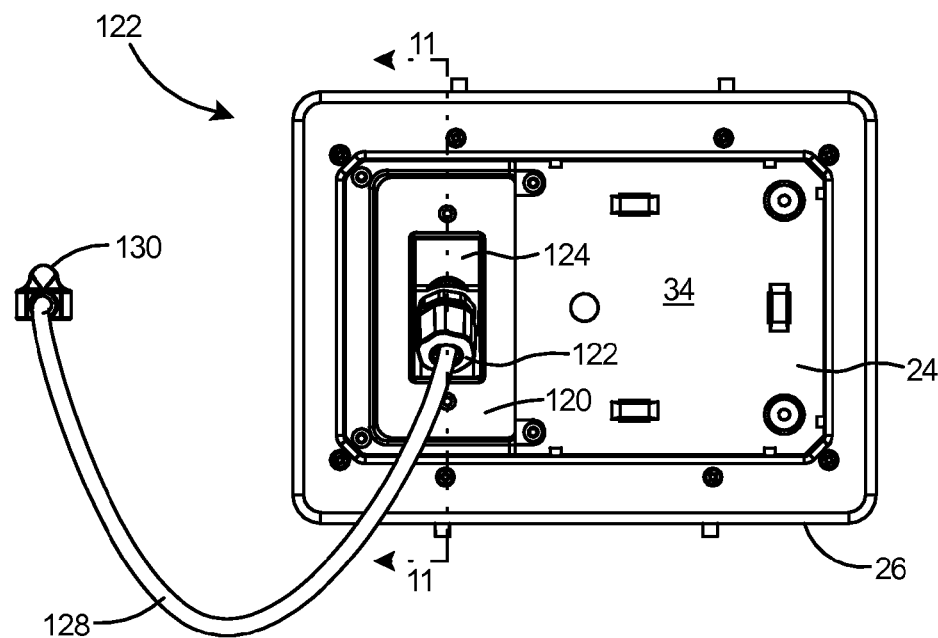
FIG. 8 is a front view of a second embodiment of the electrical box and frame assembly of the present invention.
Figure 9:
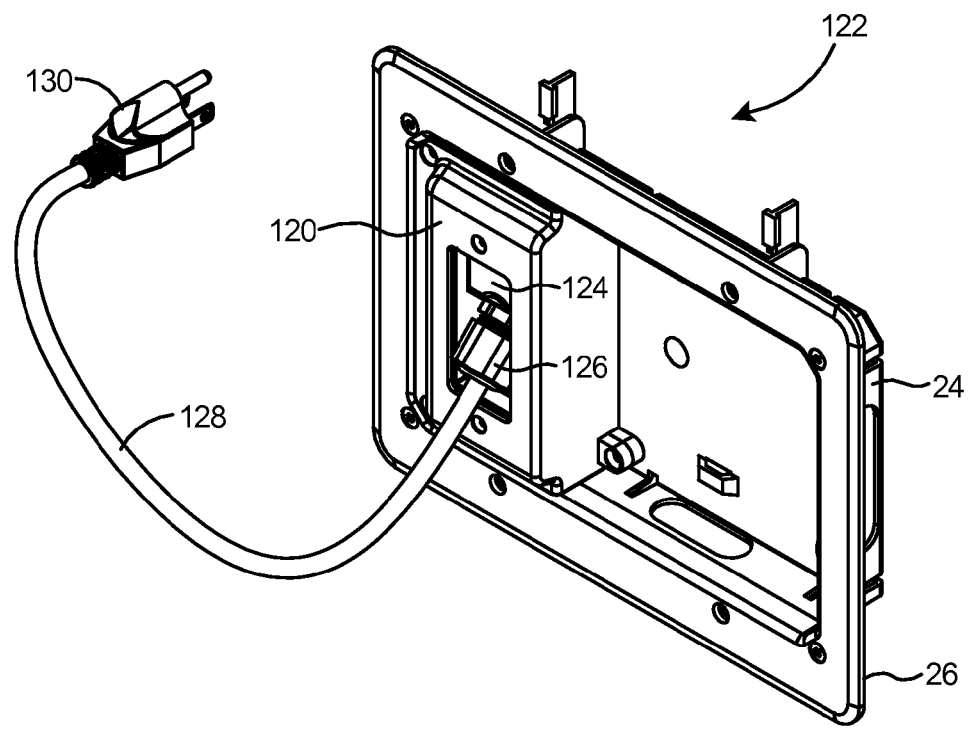
FIG. 9 is a perspective view of the electrical box and frame assembly of FIG. 8.
Figure 10:
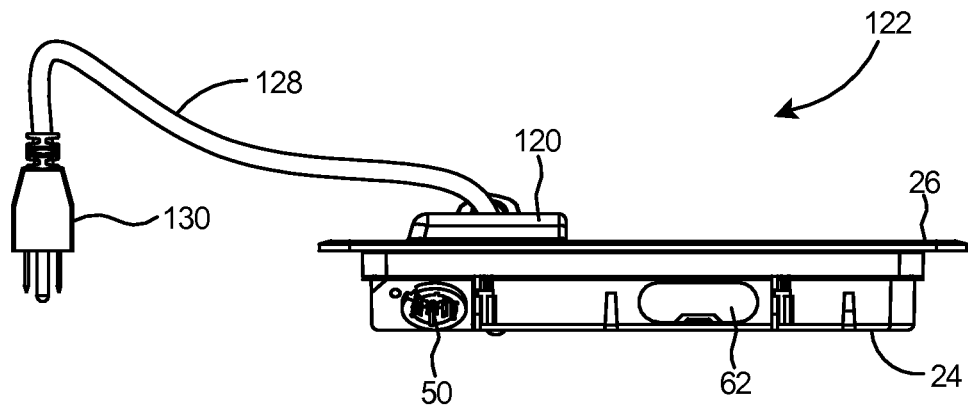
FIG. 10 is a side view of the electrical box and frame assembly of FIG. 8.

With reference to FIGS. 8 and 9, a second embodiment of the electrical box and frame assembly 122 includes the box member 22 and trim plate 26 of the first embodiment and the second embodiment of the receptacle frame 120. The receptacle frame 120 includes a cord grip mount 124 and a cord grip fitting 126. A preferred cord grip fitting 126 and cord grip mount 124 for connecting an electrical cord to an electrical box are respectively the LPCG50 cord grip and the CED50 mount, which are available from Arlington Industries of Scranton, Pa. The cord grip fitting 126 enables secure strain relief connection of a flexible cord 128 to the electrical box and frame assembly 122. When assembled as shown in FIGS. 8 and 9, the electrical box and frame assembly 122 can be used to supply electricity to a second electrical box (not shown) by plugging the plug end 130 of flexible cord 128 into an available existing electrical outlet and feeding power from receptacle frame 120 to the second electrical box.

Figure 11:
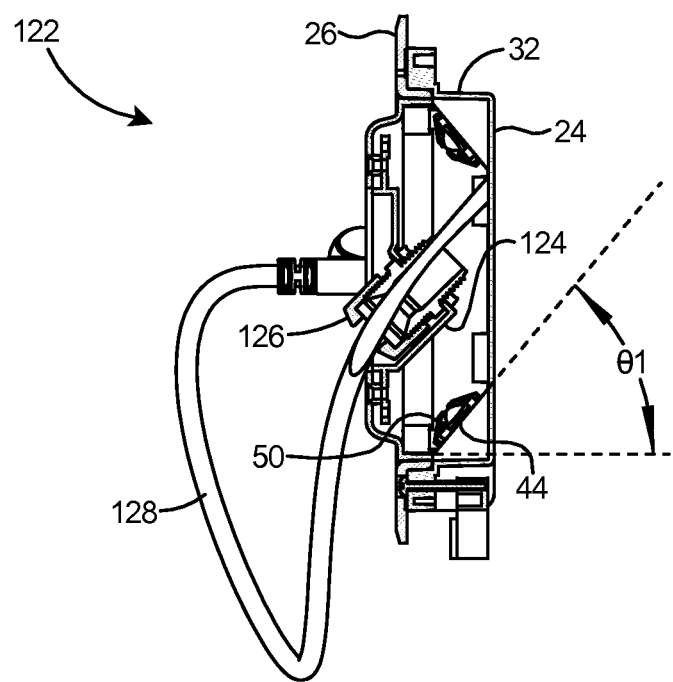
FIG. 11 is a sectional view of the electrical box and frame assembly taken along line 11-11 of FIG. 8.

As shown in FIG. 11, the cord grip fitting 126 secures flexible cord 128 to the electrical box and frame assembly 122. Slanted mounting surface 44 is at an angle with respect to the sidewalls 32 of the box member 22. Slanted mounting surface 44 is preferably at an angle of from 40 to 60 degrees, denoted by angle Θ1, with respect to the sidewalls 32 of the box member. Most preferably the slanted mounting surface 44 is at an angle of 50° with respect to the sidewalls 32 of the box member. This enables use of non-metallic electrical fitting 50 in the knockout of the slanted mounting surface 44.

Figure 16:
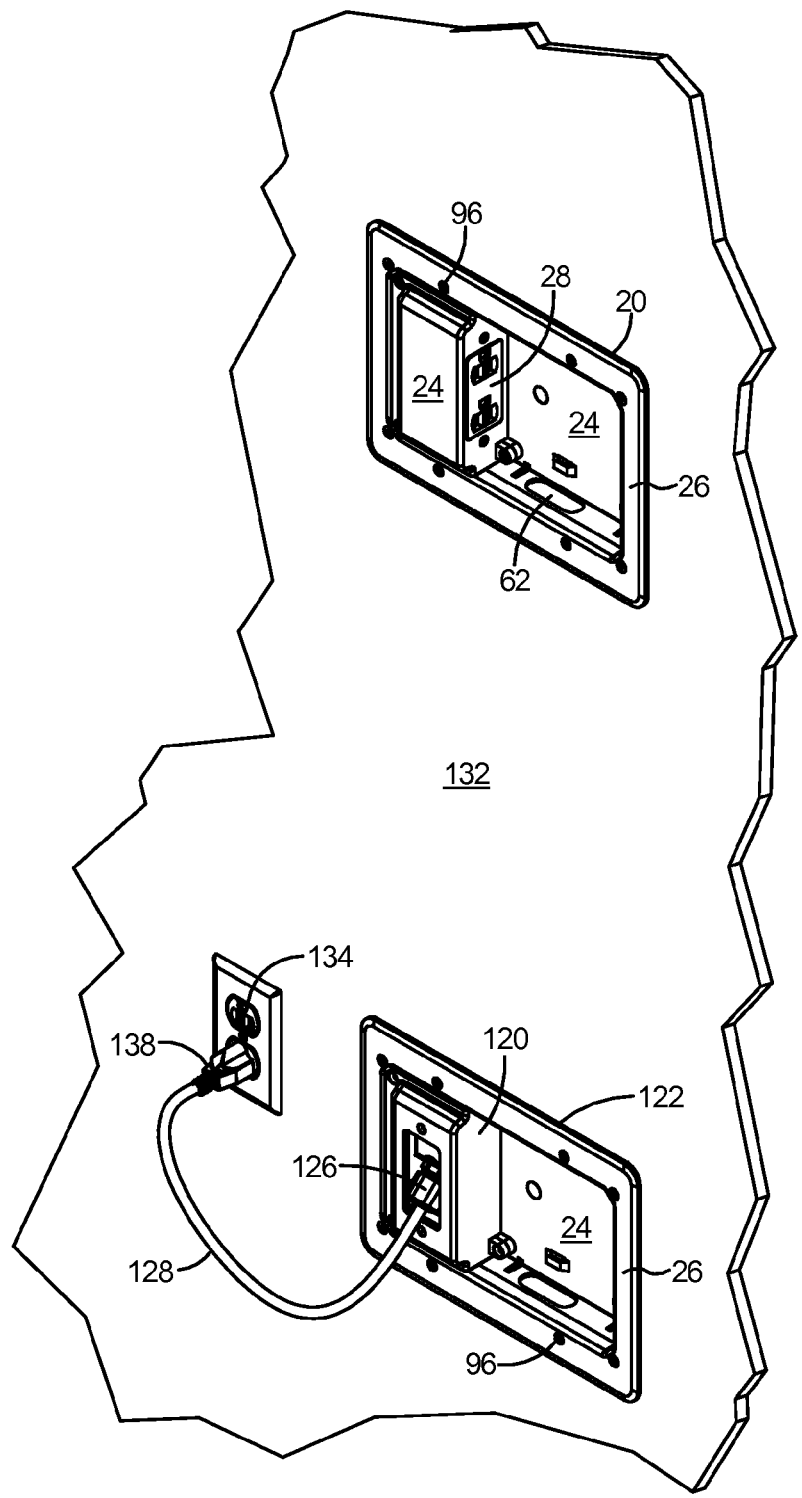
FIG. 16 is a conceptual drawing of an electrical installation utilizing the first and second embodiments the electrical box and frame assembly to reverse feed electrical power from one electrical box and frame assembly to a second electrical box and frame assembly.

With reference to FIG. 16, the electrical box and frame assemblies 20 and 122 of the present invention can be configured to reverse feed electrical power from one location to another. As an example, box and frame assembly 20 is mounted in the desired location high on a wall 132 which is remote from any existing electrical service. Prior to installing assembly 20, holes are made in the wall to accommodate the two box and frame assemblies 20 and 122. Wiring connections are made to electrical outlet 28 and a length of the connected electrical cable (not shown) is dropped behind the wall to the vicinity of box and frame assembly 122. To avoid tearing up the wall and routing electrical cable through the adjacent studs (not shown), box and frame assembly 122 is mounted at a lower location on the wall 132. The dropped cable from the top assembly 20 is then connected to the leads of flexible cable within receptacle frame 120. Receptacle frame 120 is secured to the box member 22, trim plate 26 is secured to the box member 22, and box and frame assembly 122 is secured to the wall 132 by tightening the mounting fasteners 96 which pull rotatable flags (not shown) against the rear wall surface. Electrical box and frame assembly 20 is secured to the wall in a similar manner. After both assemblies 20 and 122 are secured to the wall, flexible cable is simply plugged into the nearest existing electrical outlet 134. Power is then supplied through assembly 122 to the duplex receptacle 28 in box and frame assembly 20.

The box member 22, receptacle frame 24, and trim plate 26 portions of the box and frame assemblies 20 and 122 of the present invention may be constructed of metal or plastic. Most preferably, box member 22, receptacle frame 24, and trim plate 26 are each molded in one piece of plastic. Suitable plastics include polycarbonate and polyvinylchloride.

With reference to FIGS. 14 and 15, although the electrical box and frame assemblies herein are depicted with a first embodiment 24 and a second embodiment of the receptacle frame 120, the first embodiment of the receptacle frame 24 is adapted to receive a cord grip mount 124 and cord grip fitting 126 into the opening 116 in the short sidewall 98 of the receptacle frame 24 in the same manner as the second embodiment 120 is adapted to receive it in the opening 116 in the outer wall 90.

Figure 17:
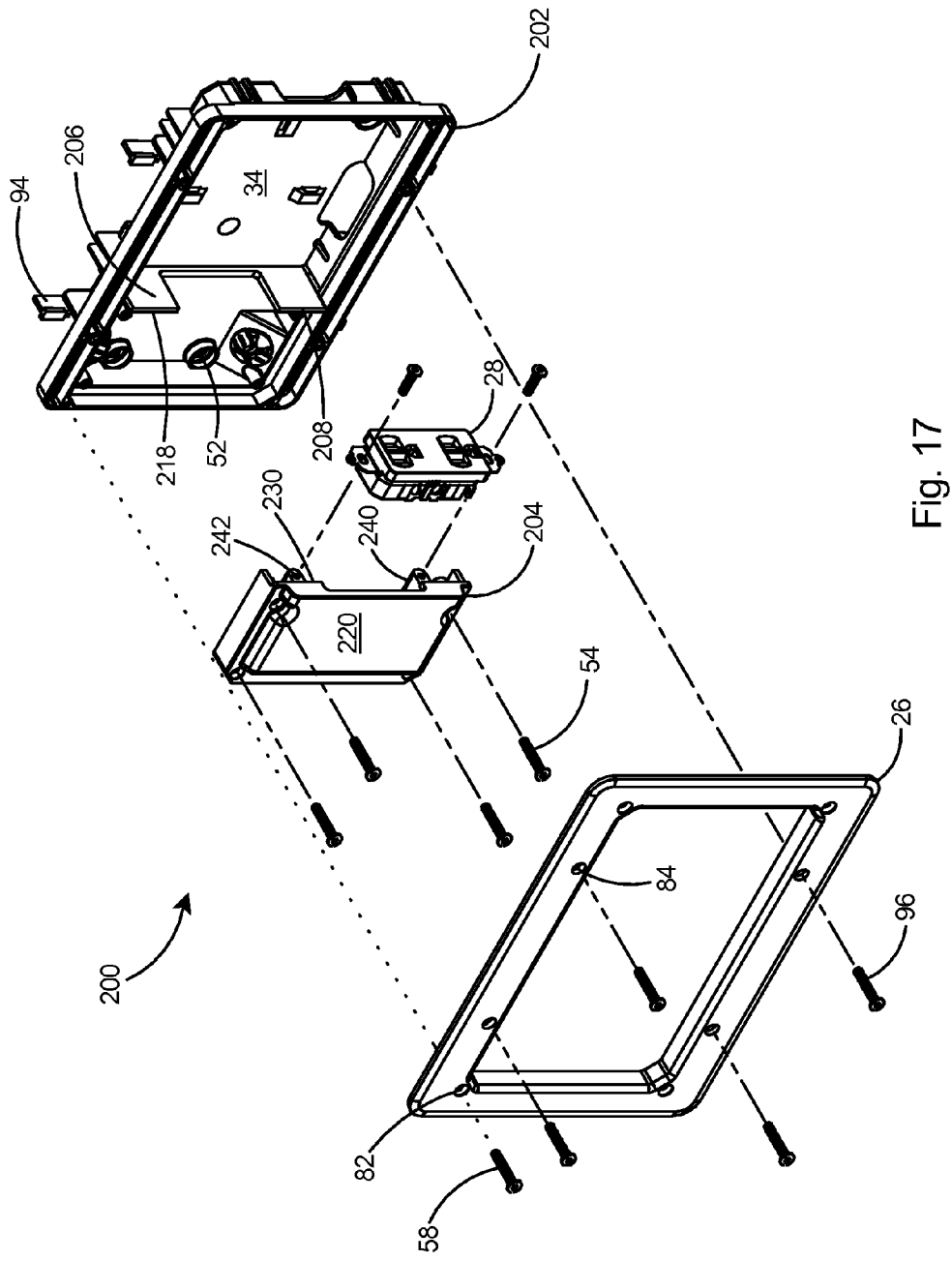
FIG. 17 is an exploded perspective view of a third and preferred embodiment of the electrical box and frame assembly of the present invention.

With reference to FIG. 17 there is shown a third and preferred embodiment of the electrical box and frame assembly 200 according to the present invention. In the subsequent drawings relating to the preferred embodiment, elements equivalent to those described in the previous embodiments are given the same reference numerals. As shown in FIG. 17, the preferred embodiment of the electrical box and frame assembly 200 includes a box member 202 and trim plate 26 to mount an electrical component such as duplex receptacle 28 to a wall. A receptacle frame 204 is adapted to mount to the box member 202 by insertion of fasteners 54 into bosses 52 on the back wall 34 of the box member 202. Box member 202 includes a divider plate 206 extending from the back wall 34.

Figure 28:
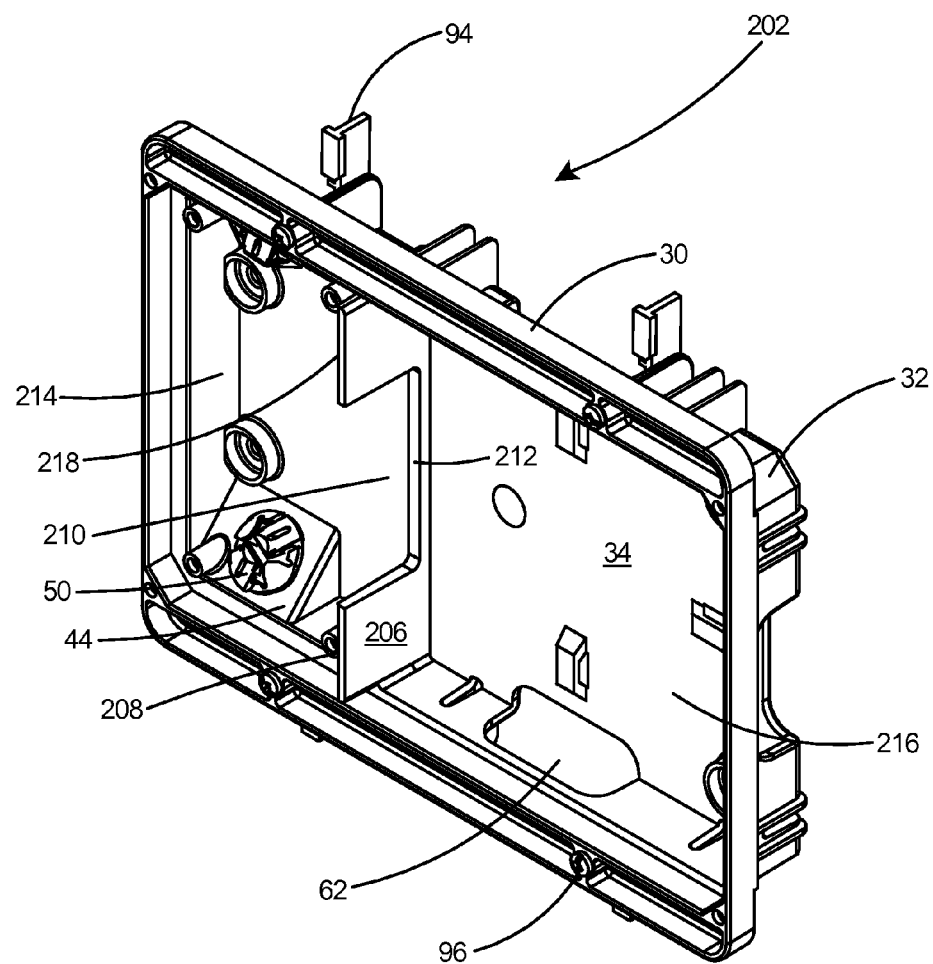
FIG. 28 is a perspective view of the box member portion of the electrical box and frame assembly of FIG. 17.

Referring to FIG. 28, divider plate 206 extends from the back wall 34 to a front edge 208 on the divider plate, and spans between a pair of opposing sidewalls 32 and the peripheral flange 30 on opposing sides of the box member 202. A notch 210 extends a substantial distance from the front edge 208 of divider plate 206 to edge 212 of the divider plate. Divider plate 206 will cooperate with the receptacle frame 204 (see FIG. 17) to divide the cavity of the box member into a high voltage compartment 214 and a low voltage compartment 216. The front edge 208 of divider plate 206 forms a parting line 218 that will form a mating surface for mating with receptacle frame (see FIG. 17) to form an electrical box within the box member.

With reference to FIGS. 18-21, receptacle frame 204 includes an outer wall 220, three long sidewalls 222, and a short sidewall 224. As shown in FIG. 21, long sidewalls 222 extend a farther distance from outer wall 220 than short sidewall 224. Short sidewall 224 includes a notch 226 therein and an inner edge 228. Receptacle frame 204 includes mating edges 230 that will mate with front edge 208 of divider plate 206 (see FIG. 17) when receptacle frame 204 and box member 202 are secured together. Bores 232 extending through receptacle frame include collars 234 that have edges 236 flush with the peripheral edge 238 of receptacle frame. Two bosses 240 extend from outer wall 220 and include bores 242 therein.

Figure 22:
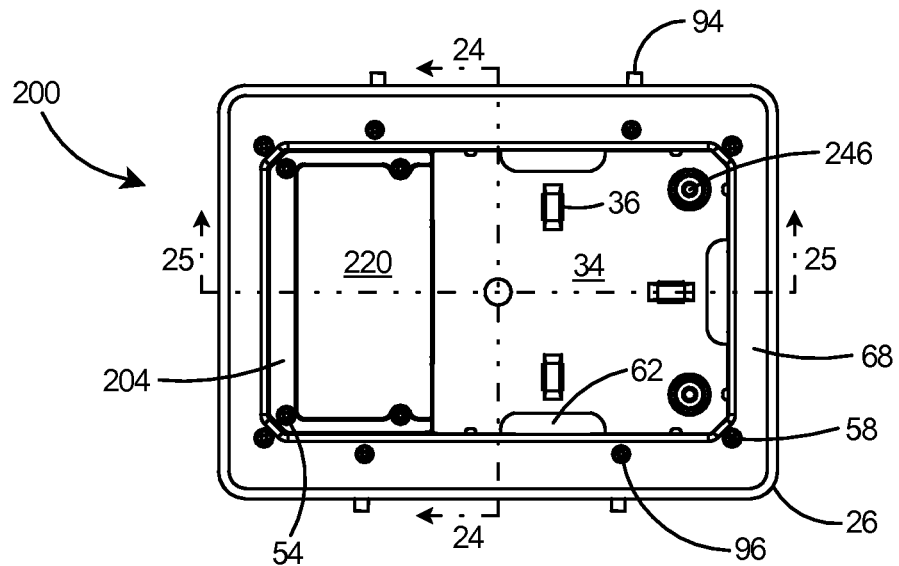
FIG. 22 is a front view of the third and preferred embodiment of the electrical box and frame assembly of the present invention.
Figure 23:
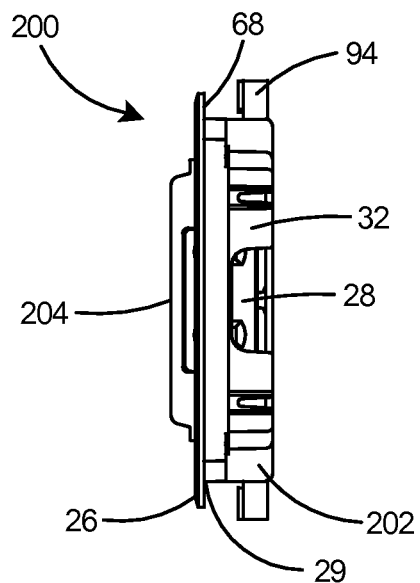
FIG. 23 is a side view of the electrical box and frame assembly of FIG. 22.

As illustrated in FIG. 22, the receptacle frame 204 is secured to the back wall 34 of the box member 202 by fasteners 102 driven through bores 232 (see FIG. 18) and trim plate 26 is secured to box member 202 with fasteners 58 through outer apertures 84 (see FIG. 12). Alternatively, trim plate 26 can be an integrally formed portion of box member 202 as shown in FIGS. 22 and 23, thereby providing a flange 68 for establishing a flush fit against a wall (see FIG. 24) when the box member 22 is inserted into an opening formed therein in the wall. In this embodiment, a separate trim plate is not required as flange 68 is formed integrally with box member 202. Flange 68 extends from the front edge 29 of the box member and is substantially orthogonal to sidewalls 32 of box member 22 and substantially parallel to back wall 34.

Figure 24:
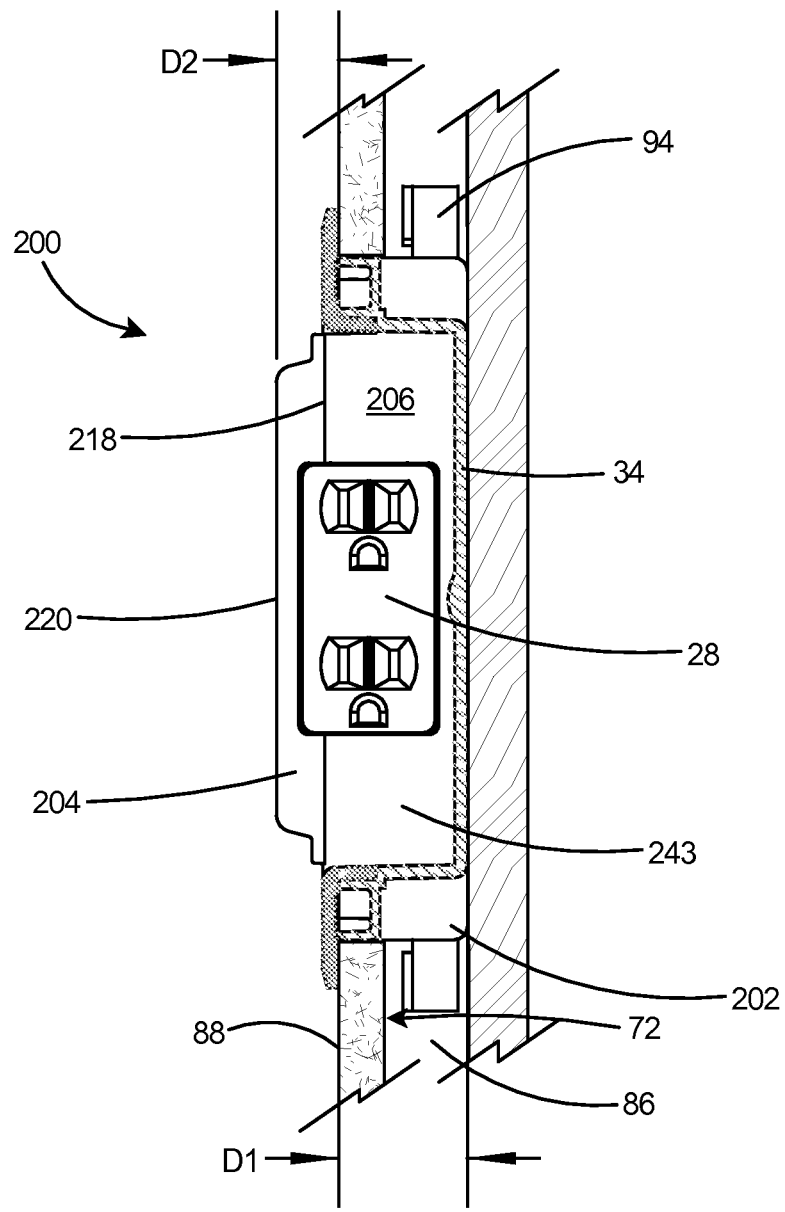
FIG. 24 is a sectional view of the electrical box and frame assembly taken along line 24-24 of FIG. 22 and depicting the electrical box and frame assembly installed in a shallow wall cavity.
Figure 25:
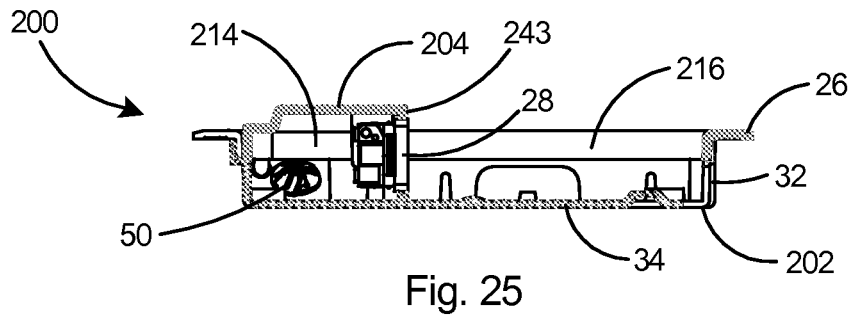
FIG. 25 is a sectional view of the electrical box and frame assembly taken along line 25-25 of FIG. 22.

As shown in FIG. 24, when box member 202 and receptacle frame 204 are fully installed such that mating edges of receptacle frame 204 join the front edge of the divider plate 206 at parting line 218, the rear side 72 of trim plate 26 is flush against the wall 88 and, with ½-inch thick wallboard, the outer wall 220 of the receptacle frame 24 extends outward of the wall surface only a slight distance of 0.585-inch, denoted by dimension D2 in FIG. 24, from the outer surface of the wall 88. As in the first embodiment, the shallow wall cavity 86 has a depth, equal to dimension D1 on FIG. 24, of 1.25 inches, enabling the third and preferred embodiment of the electrical box and frame assembly 200 to be installed in shallow wall cavities such as those formed by furring strips. Duplex receptacle 28 resides substantially within the wall cavity and outer wall 220 of receptacle frame 204 extends slightly more than a half-inch from the wall surface thereby enabling a homeowner to place furniture substantially near the wall thereby conserving floor space. Any plug ends (not shown) of electrical plugs that are plugged into receptacle 28 will be recessed substantially within the wall in low voltage compartment 216, thereby out of the way of furniture, appliances, and other house furnishings. The portions of receptacle frame 204 and divider plate 206 that join at parting line 218 form an electrical box face 243 with an opening therein to which electrical components such as duplex receptacle 28 can be connected to bosses 240 (see FIG. 21) of receptacle frame. As shown in FIGS. 24 and 25, the electrical box face 243 is orthogonal to the back wall 34 of the box member 202 and is facing the sidewall 32 of the box member 202.

Figure 26:
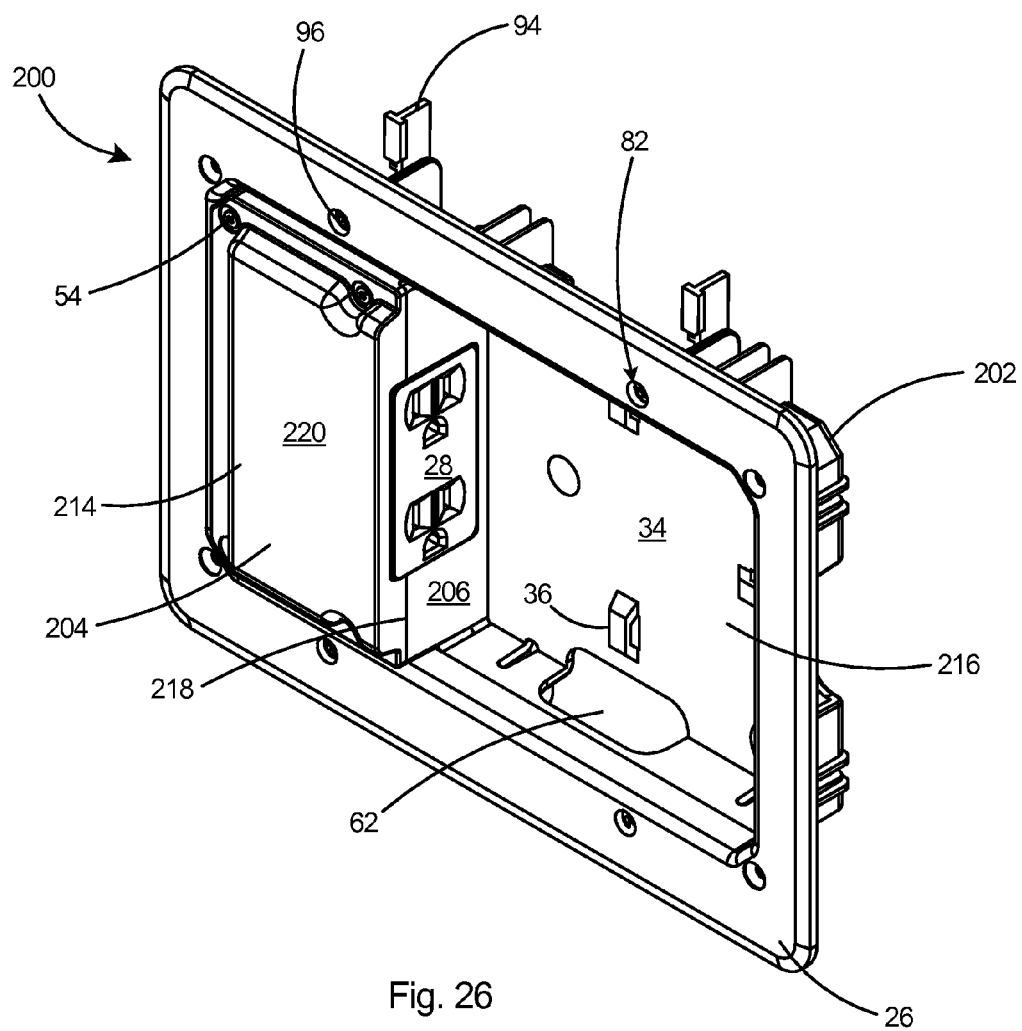
FIG. 26 is a perspective view of the third and preferred embodiment of the electrical box and frame assembly of the present invention.

As shown in FIG. 26, after electrical wiring (not shown) is pulled into the high voltage compartment and secured to duplex receptacle 28, receptacle frame 204 is secured to box member 202 by fasteners 54 thereby creating an electrical box 244 with a duplex receptacle 28 mounted therein. As inner apertures 82 in trim plate 26 are of larger diameter than the heads of the mounting fasteners, mounting fasteners 96 are accessible through inner apertures 82 in trim plate 26, the mounting fasteners 96 can be rotated to urge rotatable flags 94 against the back side of the wallboard (not shown) in order to secure the electrical box and frame assembly 200 to a wall. Alternatively, mounting fasteners (not shown) can be driven through apertures 246 (see FIG. 22) in back wall 34 of box member 202 to secure box member directly to the substrate behind the wall.

Figure 27:
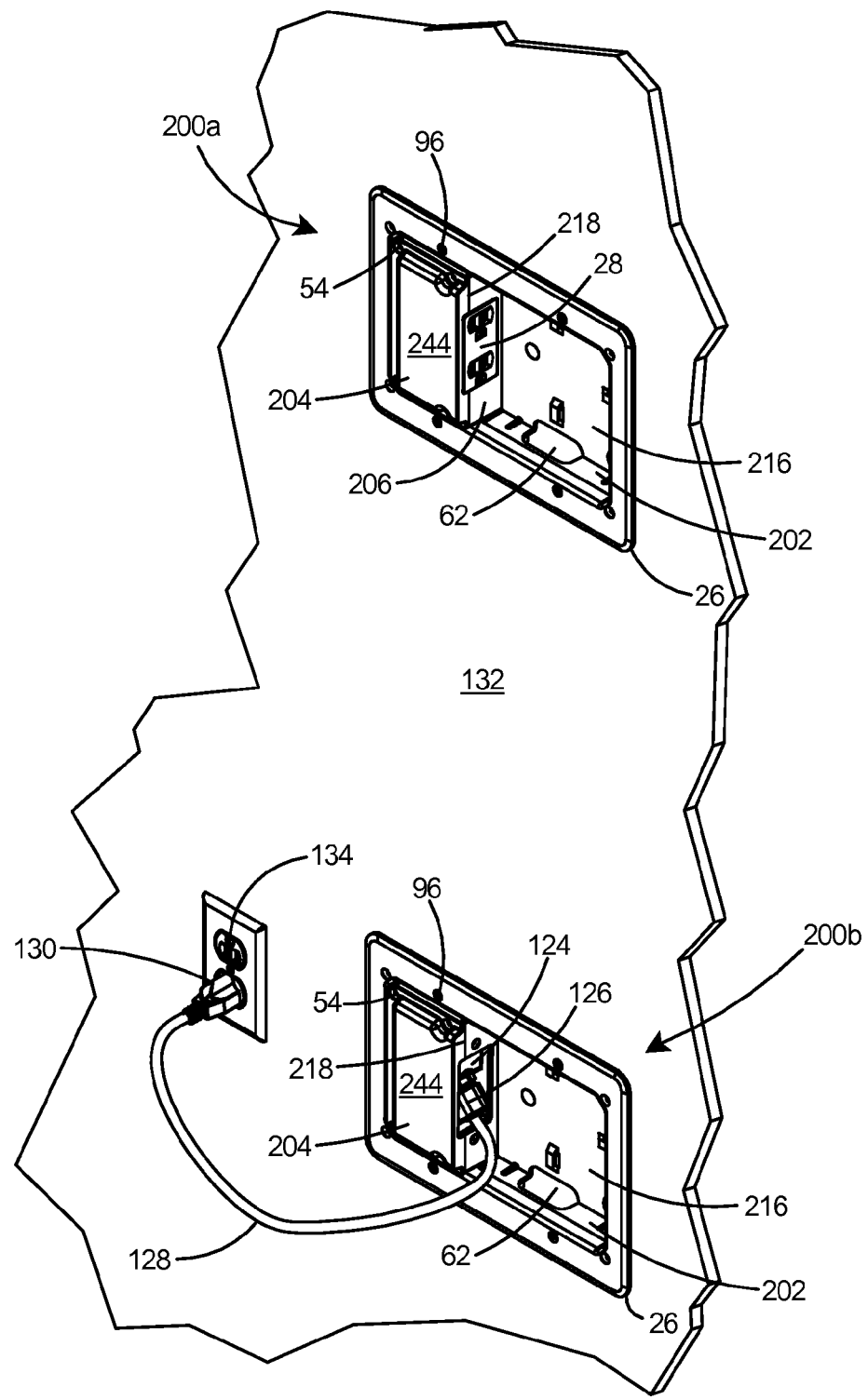
FIG. 27 is a conceptual drawing of an electrical installation utilizing the preferred embodiment of the electrical box and frame assembly to reverse feed electrical power from one electrical box and frame assembly to a second electrical box and frame assembly.

With reference to FIG. 27, similar to the first embodiment shown in FIG. 16, the preferred embodiment of the electrical box and frame assembly 200 can be configured to reverse feed electrical power from one location to another in order to provide electrical power on a wall area that was previously devoid of electrical hookups. As an example, box and frame assembly 200a is mounted in a desirable location high on a wall 132 which is remote from existing electrical service. Prior to installing assembly 200a, holes are made in the wall to accommodate the box member portion of the two box and frame assemblies 200a and 200b. Wiring connections are made to electrical outlet 28 in box and frame assembly 200a and a length of the connected electrical cable (not shown) is dropped behind the wall to the vicinity of box and frame assembly 200b. Mounting box and frame assembly 200b at a lower location on the wall 132 enables the installer to avoid routing electrical cable through the adjacent studs (not shown) thereby avoiding tearing up the wall. The dropped cable from the top assembly 200a is then connected to the leads of flexible cable within receptacle frame 200b. Receptacle frame 204 is secured to the box member 202, trim plate 26 is secured to the box member 202, and box and frame assembly 200a is secured to the wall 132 by tightening the mounting fasteners 96 which tighten rotatable flags (not shown) against the rear wall surface. Electrical box and frame assembly 200b, which includes a cord grip mount 124 and a cord grip fitting 126 installed in the electrical box 244, is secured to the wall in the same manner as described hereinabove for box and frame assembly 200a. After both assemblies 200a and 200b are secured to the wall, plug end 130 of flexible cord 128 is simply plugged into the nearest existing electrical outlet 134. Power is then supplied from wall outlet 134 through electrical box 244 in box and frame assembly 200b to the duplex receptacle 28 in box and frame assembly 200a. A preferred cord grip fitting 126 and cord grip mount 124 for connecting an electrical cord to an electrical box are respectively the LPCG50 cord grip and the CED50 mount, which are available from Arlington Industries of Scranton, Pa. The cord grip fitting 126 holds the flexible electrical cord 128 tightly to the electrical box 244 thereby providing a substantially tamper-proof connection.

If needed, low voltage cables (not shown) can be fed between the cable openings 62 in each box and frame assembly 200a and 200b to supply low voltage signals to each low voltage compartment 216. As an example, if box and frame assembly 200a is mounted high on a wall to provide high and low voltage hookups for a flat panel TV, then low voltage cable, which is typically at floor level, can be fed through cable opening 62 in assembly 200b and pulled through cable opening 62 in assembly 200a in order to supply low voltage hookups such as cable TV signal or surround sound cables.

After box and frame assemblies 200a and 200b are secured to the wall 132, a homeowner can easily troubleshoot problems by pulling plug end 130 of flexible cord 128 out of the electrical outlet 134 to remove power from both box and frame assemblies 200a and 200b to depower the two assemblies, after which receptacle frame 204 can be safely removed to inspect internal wiring connections. Receptacle frame 204 would separate from the box and frame assembly at the parting line 218. Furthermore, as the box and frame assemblies 200a and 200b are secured to the wall 132 by rotatable flags (see FIG. 27), the flags can be reversed by rotation of mounting fasteners 96, thereby enabling removal of the assemblies 200a and 200b from the wall. Such removal would facilitate routing of additional cables, such as low voltage cables, between the two assemblies after initial installation to the wall. The box and frame assemblies 200a and 200b would then be reattached to the wall by tightening mounting fasteners 96 thereby drawing rotatable screws against the wall.

Figure 29:
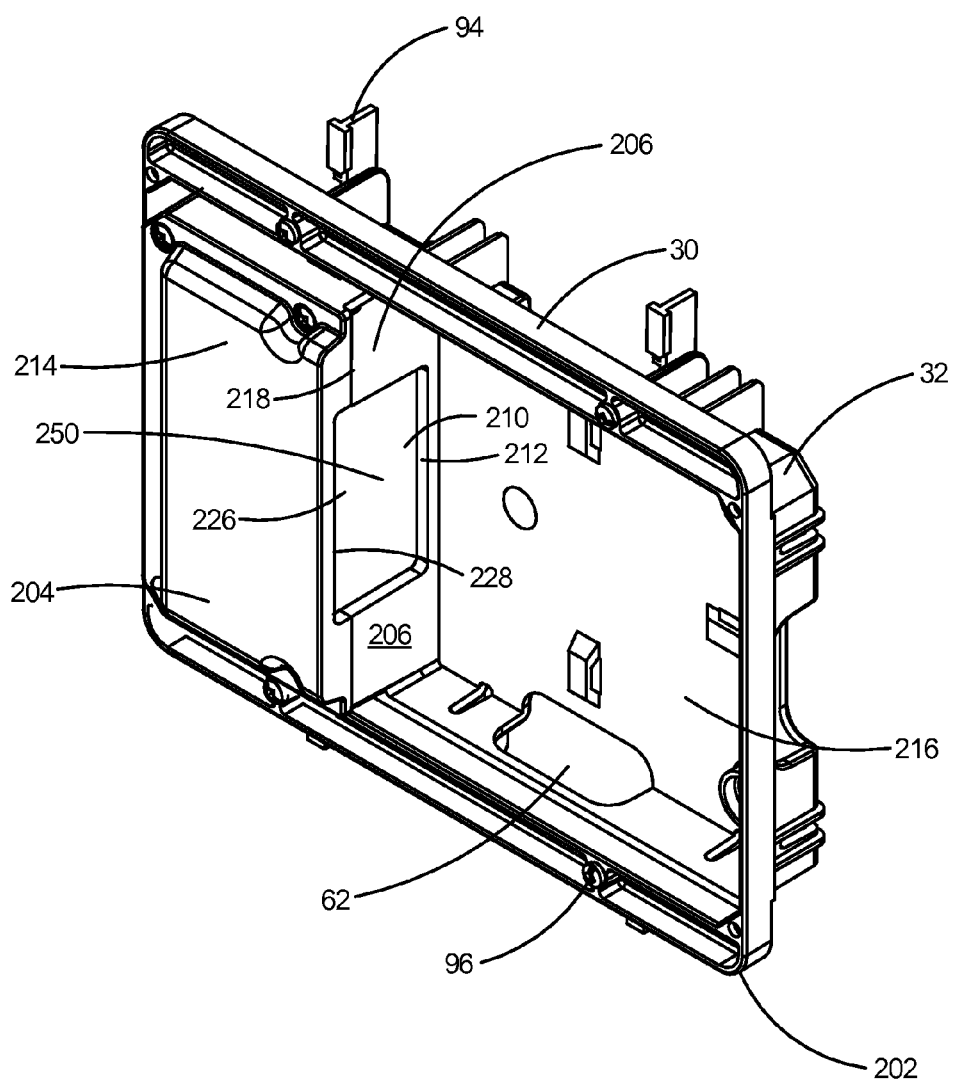
FIG. 29 is a perspective view of the receptacle frame and box member of the third and preferred embodiment joined together.

With reference to FIG. 29, the receptacle frame 204 and box member 202 of the third and preferred embodiment are depicted joined together without an electrical component installed in the electrical box 214. When receptacle frame 204 is installed in box member 202, receptacle frame and divider plate 206 join at parting line 218. The portions of receptacle frame 204 and divider plate 206 that join at parting line 218 form an electrical box face 243 with an opening 250 therein to which electrical components such as a duplex receptacle (not shown) can be seated. Opening 250 is formed by notch 226 in receptacle frame 204 and notch 210 in divider plate being aligned with one another across electrical box face 243.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical box and frame assembly comprising:
    a box member including two pairs of opposing sidewalls and a back wall forming a cavity therein, said sidewalls including a front edge;
    a divider plate integral with and extending from said back wall of said box member, said divider plate extending between one of said pairs of opposing sidewalls of said box member, said divider plate including a notch therein;
    a receptacle frame adapted for attachment to said box member, said receptacle frame including integral bosses adapted for the mounting of an electrical component thereto such that said electrical component is mounted orthogonal with respect to said front edge of said box member, said receptacle frame including a sidewall with a notch therein;
    connection of said receptacle frame to said box member aligning said notch in said receptacle frame with said notch in said divider plate thereby forming an electrical box face with an opening therein for receipt of said electrical component; and
    a trim plate extending from said front edge of said box member, said trim plate effecting a flush fit of said box member against the wall.

2. The electrical box and frame assembly of claim 1 including
    a flange on said trim plate;
    a peripheral flange on said box member; and
    said box member including a depth measured from said front edge of said box member to said rear surface of said back wall of no more than 1.25 inches.

3. The electrical box and frame assembly of claim 2 including a mounting arrangement for securing said box member to said wall.

4. The electrical box and frame assembly of claim 3 wherein said mounting arrangement includes
    apertures in said flange of said trim plate;
    apertures in said peripheral flange of said box member;
    mounting fasteners including distal ends, said mounting fasteners extending through said apertures in said flange of said trim plate and through said apertures in said peripheral flange of said box member; and
    rotatable flags attached to said distal end of said mounting fasteners.

5. The electrical box and frame assembly of claim 1 wherein said box member includes
    a slanted mounting surface; and
    a knockout in said slanted mounting surface.

6. The electrical box and frame assembly of claim 5 including a cable connector in said knockout of said slanted mounting surface.

7. The electrical box and frame assembly of claim 5 wherein said slanted mounting surface is at an angle of from 40 to 60 degrees with respect to said sidewalls of said box member.

8. The electrical box and frame assembly of claim 1 wherein
    said receptacle frame includes a short sidewall and three long sidewalls; and
    a mating edge on said short sidewall of said receptacle frame.

9. The electrical box and frame assembly of claim 8 including
    a peripheral edge on said long sidewalls of said receptacle frame;
    bores extending through said receptacle frame; and
    collars surrounding said bores, said collars including edges flush with said peripheral edge of said receptacle frame.

10. The electrical box and frame assembly of claim 8 wherein said divider plate includes a front edge, said front edge of said divider plate mating with said mating edge of said receptacle frame and said long sidewalls of said receptacle frame mating with said back wall of said box member to form an electrical box within said box member when said receptacle frame is secured to said box member.

11. The electrical box and frame assembly of claim 10 wherein said front edge of said divider plate joins said mating edge of said receptacle frame to form a parting line between said divider plate and said receptacle frame.

12. The electrical box and frame assembly of claim 1 wherein said electrical box face is orthogonal to said back wall of said box member and said electrical box face faces said sidewalls of said box member.

13. The electrical box and frame assembly of claim 1 wherein said electrical component is a duplex receptacle.

14. The electrical box and frame assembly of claim 1 wherein said electrical component is a cord grip mount and a cord grip fitting.

15. The electrical box and frame assembly of claim 1 wherein said sidewalls of said box member include one or more cable openings therein.

16. The electrical box and frame assembly of claim 15 wherein said back wall of said box member includes a cable tie-off clip.

17. The electrical box and frame assembly of claim 1 including
    a fastening arrangement for securing said box member to a substrate;
    said fastening arrangement including an aperture in said back wall of said box member; and
    a collar around each aperture.

18. The electrical box and frame assembly of claim 1 wherein
    said trim plate includes a flange having a rear side and a peripheral wall extending from said rear side of said flange; and
    said peripheral wall of said trim plate nests within said sidewalls of said box member when said trim plate and said box member are secured together.

19. The electrical box and frame assembly of claim 1 including
    two of said electrical box and frame assemblies used in conjunction to reverse feed power from a first electrical box and frame assembly to a second electrical box and frame assembly;
    said first electrical box and frame assembly including a cord grip mount, a cord grip fitting, and an electrical cord including an end secured to said electrical box and frame assembly by said cord grip fitting and a plug end for connection to an electrical outlet; and
    a second electrical box and frame assembly including a duplex receptacle secured to said receptacle frame,
    whereby power is supplied from said electrical outlet through said electrical cord and to said first electrical box and frame assembly and thence to said duplex receptacle of said second electrical box and frame assembly.

* * * * *